United States Patent [19]

Furomoto

[11] Patent Number: 5,139,213
[45] Date of Patent: Aug. 18, 1992

[54] FISHING REEL WITH LEVEL WINDER

[75] Inventor: Yoshiyuki Furomoto, Osaka, Japan

[73] Assignee: Shimano Industrial Co., Ltd., Osaka, Japan

[21] Appl. No.: 599,120

[22] Filed: Oct. 17, 1990

[30] Foreign Application Priority Data

Oct. 18, 1989 [JP] Japan ............... 1-122389[U]

[51] Int. Cl.⁵ ........................................... A01K 89/015
[52] U.S. Cl. ................................................... 242/279
[58] Field of Search ............... 242/278, 279, 280, 281, 242/158.3

[56] References Cited

U.S. PATENT DOCUMENTS

| | | | |
|---|---|---|---|
| 1,692,466 | 11/1928 | Pflueger | 242/279 |
| 1,740,222 | 12/1929 | Broadwell et al. | 242/279 |
| 2,134,099 | 10/1938 | Balz | 242/279 |
| 2,523,134 | 9/1950 | Maynes | 242/279 X |
| 3,447,760 | 6/1969 | Sarah | 242/279 |
| 4,196,868 | 4/1980 | Puryear et al. | 242/232 |
| 4,638,958 | 1/1987 | Furomoto | 242/310 |
| 4,750,684 | 6/1988 | Morimoto | 242/279 X |
| 4,772,410 | 9/1988 | Sato | 242/279 |
| 4,821,978 | 4/1989 | Kaneko | 242/310 |
| 4,974,792 | 12/1990 | Miyazaki | 242/279 |

*Primary Examiner*—John M. Jillions
*Attorney, Agent, or Firm*—Dickstein, Shapiro & Morin

[57] ABSTRACT

A fishing reel is formed of a spool for winding up a fishing line, a traverse shaft provided with a spiral guide portion and rotatable in response to rotation of the spool, an enclosure for enclosing at least one side portion of the traverse shaft, and a level winder. The traverse shaft extends through the level winder by a first bore, and the enclosure extends through the level winder by a second bore. The level winder includes a guided member engageable with the spiral guide portion of the traverse shaft which is attached through a third bore perpendicularly connected to the first bore. The level winder is slidably reciprocated due to guiding engagement between the guided member and the spiral guide portion based on rotation of the traverse shaft to thereby wind up the fishing line in the spool. The portions of the level winder defining the first bore, the second bore and the third bore, respectively, are formed integrally with each other.

6 Claims, 2 Drawing Sheets

FISHING REEL WITH LEVEL WINDER

BACKGROUND OF THE INVENTION

1. Field of the Invention

The present invention relates to a fishing reel comprising a spool for winding up a fishing line, a traverse shaft provided with a spiral guide portion and rotatable in response to rotation of the spool, an enclosure for enclosiong at least one side portion of the traverse shaft, and a level winder through which the traverse shaft extends by a first bore, and the enclosure extends by a second bore, the level winder including a guided member engageable with the spiral guide portion of the traverse shaft and attached through a third bore perpendicularly connected to the first bore, in which the level winder is slidably reciprocated due to guiding engagement between the guided member and the spiral guide portion based on rotation of the traverse shaft thereby to winding up the fishing line in the spool.

2. Description of the Prior Art

An example of the above noted fishing reels is proposed in Japanese Utility Model application "Kokai" No. 62-148063 which discloses that the level winder consists of two separate members, i.e. a first member defining the first bore and a second member defining the third bore, and that the second bore is defined by an outer face of the first member and an inner face of the second member. With the conventional structure, the enclosure having a C-shaped section covers one side portion of the traverse shaft to prevent the fishing line being wound up from entwining with the rotating traverse shaft. The first member engages the guided member with the spiral guide portion of the traverse shaft and guides the enclosure and the traverse shaft.

However, such a conventional struture is disadvantageous in that, if the first member is not accurately assembled to the second member, sliding movement of the level winder with respect to the traverse shaft and the enclosure or movement of the guided member by the traverse shaft are more likely to be disturbed. Additionally, the number of parts is increased, which results in a complicated assembling work.

Also, an outer surface of the enclosure and the traverse shaft are sandwiched between the second member and the guided member thereby to reliably engage the guided member with the spiral guide portion of the traverse shaft. As a result, if the traverse shaft is bent or eccentrically mounted, engagement between the guided member and the spiral guide portion is not stabilized, which tends to disturb smooth traverse movement of the level winder.

Furthermore, according to the conventional structure, an inner surface of the enclosure is adapted not to be in sliding contact with the first member. Thus, when the guided member is displaced after a long-term use, the level winder is in danger of clattering in a radial direction toward an opened portion of the C shape of the enclosure. In addition, when a force is imparted to the level winder in a direction along the traverse shaft, the level winder is inclined relative to the enclosure due to the clattering thereby to cause a strain between the level winder and the enclosure. Besides, if the rigidity of the enclosure is not sufficient, the enclosure is in danger of being deformed by the strain.

SUMMARY OF THE INVENTION

A primary object of the present invention is to provide a fishing reel having a simpole structure which can reduce the manufacturing time and can smooth traverse movement of a level winder.

A secndary object of the invention is to provide a fishing reel which can further smooth traverse movement of the level winder and can restrain clattering of the level winder and deterioration of the strength of a traversing mechanism of the level winder.

In order to achieve the above noted primary object, the present invention is characterized by portions of the level winder defining a first bore through which a traverse shaft extends, a second bore through which an enclosure extends, and a third bore to which a guided member is attached, which are formed integrally with each other.

With such a structure, relative positions between the first, the second and the third bores are not varied once those bores are defined. Accordingly, the level winder is smoothly slided along the traverse shaft and the enclosure. Also, a guided member and a spiral guide groove are reliably engaged thereby to prevent movement of the guided member by the traverse shaft from being disturbed. Additionally, the number of parts is decreased to simplify the assembling work per se.

In order to achieve the above noted secondary object, the present invention is characterized in that the first bore of the level winder is defined to have substantially the same section as the traverse shaft has.

According to this characteristic feature, the traverse shaft slidably extends through the first bore of the level winder without defining a space therebetween. Therefore, the level winder is reliably supported by the traverse shaft even after a long-term use, which is less likely to cause clattering of the level winder, and realizes smooth traverse movement of the level winder by stable engagement between the spiral guide portion and the guided member. Also, less possibility of clattering can reduce the danger of imparting the strain to the level winder by the force produced in a direction along the traverse shaft. Thus, the enclosure is less likely to be deformed, and the traversing mechanism of the level winder can have a greater strength.

In working the present invention, means for preventing the level winder from rotating about the traverse shaft may be provided, and a clearance may be defined between the second bore of the level winder and the enclosure, thereby to further smooth traverse movement of the level winder.

The level winder may be integrally formed of synthetic resin thereby to readily define respective bores and to lighten the level winder per se. Thus, in a bait casting type reel (when a rod is swung to csat the fishing line with the spool being in a free rotation condition, the level winder is reciprocated with rotation of the spool), for example, a mechanical resistance can be reduced which is produced by the level winder and acting upon the rotation of the spool when casting the fishing line. This allows the fisherman to cast further the fishing line.

Furthermore, the level winder may be integrally formed of sintered metal thereby to enhance the strength of the level winder per se, and may be integrally formed of ceramic therby to improve the abrasion resistance of the level winder.

Other objects, features and advantages of the invention will be apparent from the following description.

BRIEF DESCRIPTION OF THE DRAWINGS

The drawings show a fishing reel embodying the present invention, which.

DESCRIPTION OF THE PREFERRED EMBODIMENTS

The present invention will be described below referring to the accompanying drawings.

Figure 4:
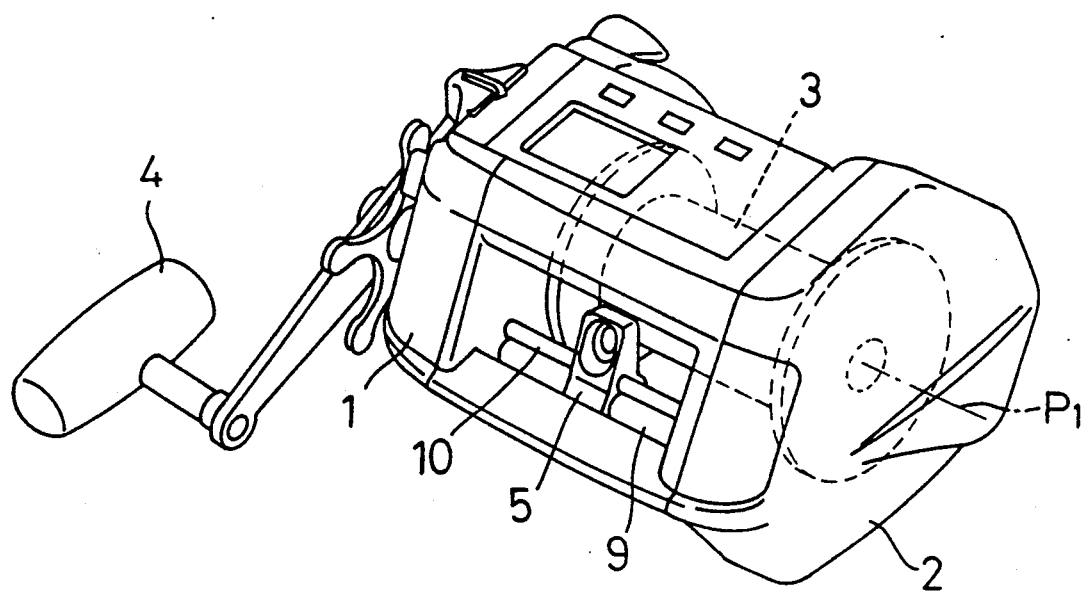
FIG. 4 is a perspective view of the fishing reel according to the present invention.

FIG. 4 is a perspective view of a fishing reel comprising a spool 3 extending between left and right support cases 1 and 2 for winding up a fishing line (not shown) to be pivotable about a horizontal axis P1. The left suppoort case 1 carries a handle 4. When the handle 4 is counterclockwise rotated, the spool 3 is clockwise rotated through a gear mechanism (not shown) mounted within the support case 1 to wind up the fishing line.

A level winder 5 into which the fishing line is inserted is slidably reciprocated along an enclosure 9 having a C-shaped section and a guide rod 10, both of which are fiedly mounted between the left support case 1 and the right support case 2. This permits the spool 3 to wind up the fishing line uniformly over its width.

Figure 1:
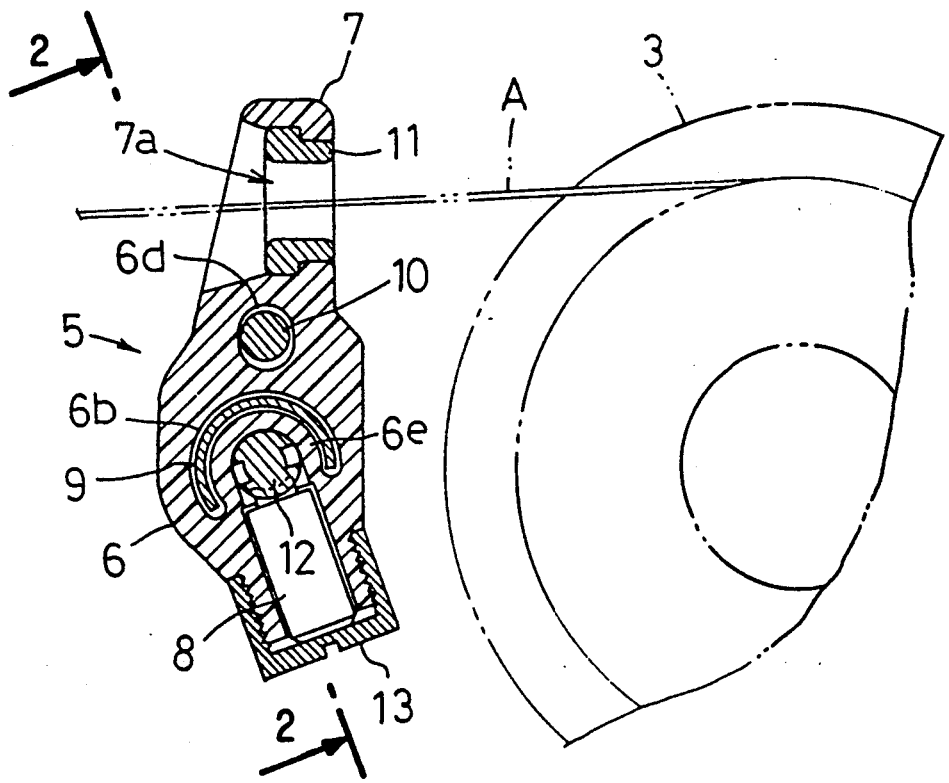
FIG. 1 is a vertical section in side view of a level winder in a use condition.
Figure 2:
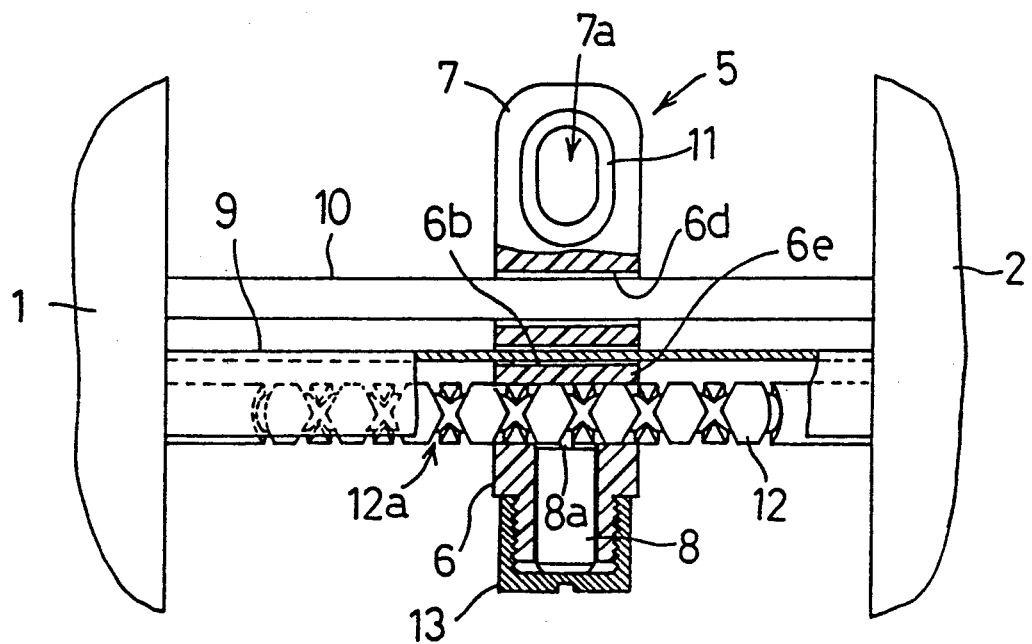
FIG. 2 is a vertical section in front view of the level winer in the use condition along section line 2-2 of FIG. 1.
Figure 3:
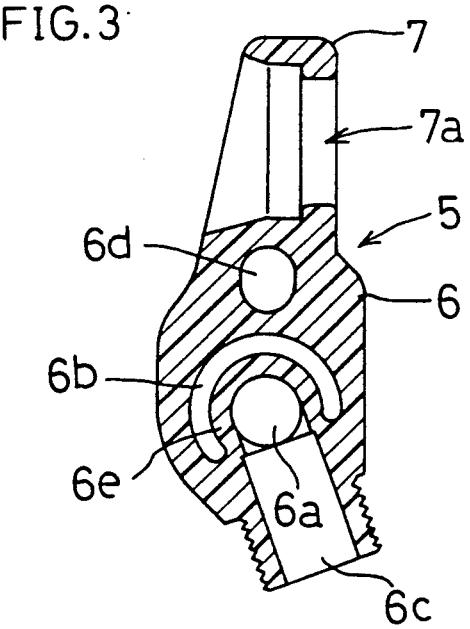
FIG. 3 is a verticcal section in side view, like FIG. 1, except that FIG. 3 is a view of only the level winder.

The level winder 5 and a sliding structure thereof will be set forth in detail next. As can be seen from FIGS. 1 to 3, the level winder 5 includes a fishing line guide portion 7 provided with an opening 7a, for guiding the fishing line A, and a body 6. the body 6 and fishing line guid portion 7 are made of synthetic resin, sintered metal or cceramic, and formed integrally with each other. A ring member 11 made of silicon carbide, ceramic or the like is fitted in an inner surface of the openings 7a of the fishing line guide portion 7.

The body 6 defines a first bore 6a having a circular section and a second bore 6b coaxial with the first bore and having substantially the same C-shaped section as the enclosure 9. A traverse shaft 12 positioned within the enclosure 9 extends through the first bore 6a and the enclosure 9 extends through the second bore 6b. Thus, the traverse shaft 12 is supportedly embraced by a portion 6e defined between the first bore 6a and the second bore 6b in the body 6. A third bore 6c is defined to communicate with and to be substantially perpendicular to the first bore 6a.

The traverse shaft 12 defines endless spiral guide grooves 12a (corresponding to a spiral guide portion) and is rotated in response to rotation of the spool 3. On the other hand, a cylindrical guided member 8 provided with a half-moon-shaped projection is freely rotatably fitted into the third bore 6c defined in the body 6 of the level winder 5. The projection 8a of the guided member 8 engages into the guide groove 12a of the traverse shaft 12. A box nut 13 for retaining the guided member 8 is screwed to the body 6.

The body 6 of the level winder 5 defines a fourth bore 6d having a slot-shaped section through which the round guide rod 10 extends thereby to prevent the level winder 5 from rotating about the traverse shaft 12. A clearance is defined between the second bore 6b and the enclosure 9 thereby to prevent a sliding contact therebetween and to smooth traverse movement of the level winder 5.

With the above noted structure, when the handle 4 is rotated, the spool 3 is also rotated which in turn rotates the traverse shaft 12. As a result, owing the engagement between the guide groove 12a and the projection 8a, the whole level winder 5 is slidably reciprocated along the enclosure 9 and the guide rod 10.

Other embodiments will be listed below.

1) Instead of the substantially cylindrical member having a C-shaped section, the enclosure 9 may include a plurality of elongated plates spaced and arranged between the support cases 1 and 2 to enclose partially an outer portiopn of the traverse shaft 12.

2) The whole level winder 5 is not necessarily continuously formed, but it is sufficient to form only the portions defining the first bore 6a, the second bore 6b and the third bore 6c, respectively, to be integrally formed with each other.

3) The means for preventing the level winder 5 from rotating about the traverse shaft 12 may include a groove defined in the level winder and a projection engaged with the groove and mounted on the support case.

What is claimed is:

1. A fishing reel comprising:
   a spool (3) for winding up a fishing line,
   a traverse shaft (12) provided with a spiral guide portion (12a) and rotatable in response to rotation of the spool (3) in at least a winding direction,
   an enclosure (9) for enclosing at least one side portion of the traverse shaft (12),
   a level winder (5) through which the traverse shaft (12) extends by a first bore (6a), and the enclosure (9) extends by a second bore (6b), the level winder including a guided member (8) engagable with the spiral guide portion (12a) of the traverse shaft (12) and attached through a third bore perpendicularly connected to the first bore (6a), and
   means for preventing the level winder (5) from rotating around the traverse shaft (12),
   wherein a clearance is defined between the second bore (6b) and the enclosure (9), said clearance being located above and below said enclosure (9),
   wherein the level winder (5) is slidably reciporcated due to guiding engagement between the guided member (8) and the spiral guide portion (12a) based on rotation of the traverse shaft (12) thereby to wind up the fishing line (A) in the spool (3),
   wherein portions of the level winder (5) defining the first bore (6a), the second bore (6b) and the third bore (6c), respectively, are formed integrally with each other, and
   wherein the inner diameter of the first bore (6a) is substantially the same as the outer diameter of the traverse shaft (12) such that the level winder (5) is slidable is close contact with and longitudinally of the traverse shaft (12).

2. A fishing reel as claimed in claim 1 wherein the level winder (5) is integrally formed of a synthetic resin.

3. A fishing reel as claimed in claim 1 wherein the level winder (5) is integrally formed of a sintered metal.

4. A fishing reel as claimed in claim 1 wherein the level winder (5) is integrally formed of a ceramic.

5. A fishing reel as claimed in claim 1 wherein the means for preventing rotation of the level winder includes a guide rod (10) parallel to the traverse shaft (12) and a fourth bore (6d) defined in the level winder (5) through which the guide rod (10) extends.

6. A fishing reel as claimed in claim 5 wherein said fourth bore (6d) is a slot which is elongated in a direction extending from the fourth bore (6d) to the first bore (6a).

* * * * *